United States Patent
Motohashi

(10) Patent No.: US 8,128,290 B2
(45) Date of Patent: Mar. 6, 2012

(54) ROLLING BEARING UNIT HAVING SENSOR

(75) Inventor: Nobutsuna Motohashi, Katsuragi (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 481 days.

(21) Appl. No.: 12/314,773

(22) Filed: Dec. 16, 2008

(65) Prior Publication Data

US 2009/0154853 A1    Jun. 18, 2009

(30) Foreign Application Priority Data

Dec. 17, 2007 (JP) ................. P2007-324680
Dec. 17, 2007 (JP) ................. P2007-324682

(51) Int. Cl.
*F16C 41/04* (2006.01)
*G01P 3/44* (2006.01)
*G01B 7/14* (2006.01)

(52) U.S. Cl. ............... 384/448; 324/207.12; 324/207.15

(58) Field of Classification Search ................. 384/446, 384/448, 482–486; 324/173, 174, 207.15, 324/207.25; 73/862.321
See application file for complete search history.

(56) References Cited

U.S. PATENT DOCUMENTS

| | | | |
|---|---|---|---|
| 4,001,687 A | | 1/1977 | Sorkin et al. |
| 5,722,777 A | * | 3/1998 | Ouchi ............... 384/446 |
| 5,744,720 A | * | 4/1998 | Ouchi ............... 384/448 |
| 5,814,984 A | * | 9/1998 | Ohmi et al. .......... 324/173 |
| 6,011,388 A | * | 1/2000 | Miyazaki et al. ...... 324/207.25 |
| 6,037,766 A | * | 3/2000 | Goossens et al. ...... 324/174 |
| 6,218,827 B1 | * | 4/2001 | Ohmi et al. .......... 384/448 |
| 6,422,075 B1 | * | 7/2002 | Foster et al. ......... 73/494 |
| 2002/0131659 A1 | | 9/2002 | Rutter et al. |
| 2004/0046547 A1 | | 3/2004 | Landrieve |
| 2006/0104558 A1 | | 5/2006 | Gallion et al. |
| 2006/0213288 A1 | * | 9/2006 | Suzuki ............... 73/862.321 |
| 2007/0058892 A1 | * | 3/2007 | Motohashi et al. ..... 384/448 |

FOREIGN PATENT DOCUMENTS

| | | |
|---|---|---|
| EP | 1 422 492 A1 | 5/2004 |
| EP | 1 550 847 A1 | 7/2005 |
| FR | 2 602 872 A1 | 2/1988 |
| JP | 2006090831 A * | 4/2006 |
| JP | 2007-127253 | 5/2007 |

* cited by examiner

*Primary Examiner* — Marcus Charles
(74) *Attorney, Agent, or Firm* — McGinn IP Law Group, PLLC

(57) ABSTRACT

A rolling bearing unit having a sensor comprising:
- a first raceway member, on the outer circumferential surface of which a raceway surface is provided;
- a second raceway member, on the inner circumferential surface of which a raceway surface is provided;
- a plurality of rolling elements arranged between the raceway surface of the first raceway member and the raceway surface of the second raceway member;
- a base plate, the shape of which is formed into an annular and flat shape, having a through-hole that the first raceway member penetrates;
- a first coil, the shape of which is formed into a plane shape, arranged so that the first coil surrounds an overall circumference of the first raceway member; and
- a plurality of second coils, the shape of which is formed into a plane shape, arranged around the first coil.

6 Claims, 5 Drawing Sheets

ROLLING BEARING UNIT HAVING SENSOR

BACKGROUND OF THE INVENTION

1. Field of the Invention

The present invention relates to a rolling bearing unit having a sensor.

2. Related Art

The rolling bearing unit for a wheel described in JP-A-2007-127253 is a conventional rolling bearing unit having a sensor.

In this rolling bearing unit for a wheel, two rows of inductance type displacement sensors are arranged in the axial direction and three translation loads and two moment loads of the rolling bearing unit for a wheel are calculated.

In the above circumstances, the following problems may be encountered. The inductance type displacement sensor needs a large space in which it is arranged. Therefore, it is difficult to reduce a size of the rolling bearing unit for a wheel.

Further, a signal sent from the displacement sensor is outputted to a signal processing portion, which is located on the opposite side to the rolling element side of the cap member with respect to the cap member, through a signal line penetrating the cap member which is arranged so that one end portion in the axial direction of the inner shaft 1 can be covered with the cap member.

In the circumstances described above, in the rolling bearing having a sensor, it is desired to reduce noise contained in the signal.

SUMMARY OF THE INVENTION

An object of the present invention is to provide a compact rolling bearing unit having a sensor capable of detecting physical quantities such as a displacement and a rotational speed.

The present invention is also related to provide a rolling bearing having a sensor in which noise contained in the signal can be reduced and physical quantities to be detected by the sensor unit can be more accurately detected.

In order to solve the above problems, the present invention provides a rolling bearing unit having a sensor comprising:

a first raceway member, on the outer circumferential surface of which a raceway surface is provided;

a second raceway member, on the inner circumferential surface of which a raceway surface is provided;

a plurality of rolling elements arranged between the raceway surface of the first raceway member and the raceway surface of the second raceway member;

a base plate, the shape of which is formed into an annular and flat shape, having a through-hole that the first raceway member penetrates;

a plane-shaped first coil arranged so as to surround an overall circumference of the first raceway member; and a plurality of plane-shaped second coils arranged around the first coil along a circumferential direction of the first coil.

According to the present invention, the second coils are arranged around the first coil along a circumferential direction of the first coil. Therefore, it is possible to arrange the first coil and the second coils in a small space. Accordingly, the rolling bearing having a sensor can be made compact.

Further, according to one aspect of the invention, the first coil and the second coils are mounted on the base plate so as to be arranged on an identical plane. By this arrangement, a size in the axial direction of the sensor unit can be dramatically reduced to the substantially same thickness as the thickness of the base plate. Accordingly, the rolling bearing having a sensor can be made compact.

Further, according to one aspect of the invention, the base plate includes a first portion which is formed into an annular and flat shape and has the through-hole that the first raceway member penetrates and a second portion which is formed into a flat shape and crosses the first portion; the first coil is arranged in the first portion; and the second coils are arranged in the second portion.

The above first raceway member includes: a member, on the outer circumferential face of which a raceway surface is provided; and all members immovably fixed to the member.

In the above described aspect of the invention, the first portion, in which the plane-shaped first coil is arranged, crosses the second portion, in which the plane-shaped second coils are arranged. Therefore, as compared with a case in which the first coil and the second coils are formed in the same plate-shaped portion, it is possible to reduce a size of the plate-shaped portion in which the first coil is formed.

Accordingly, when an angle at which the first portion and the second portion cross each other is set at an appropriate value and the base plate is appropriately arranged, the base plate, the first coil and the second coils, which are components of the sensor unit, can be arranged in a small space and it becomes possible to realize a compact rolling bearing unit having a sensor.

In an embodiment, the first portion and the second portion are respectively made of resin, and the first coil is embedded within the first portion and the second coils are embedded within the second portion.

According to the embodiment described above, the first coil is embedded within the first portion and the second coils are embedded within the second portion. Therefore, the first coil and the second coils can be positively insulated. Further, it is possible to prevent the generation of noise by the contact of the coil with foreign objects such as dust. Accordingly, physical quantities to be detected can be more accurately detected.

According to the rolling bearing unit having a sensor of the present invention, the first portion, in which the plane-shaped first coil is arranged, crosses the second portion, in which the plane-shaped second coils are arranged. Therefore, as compared with a case in which the first coil and the second coil are formed in the same plate-shaped portion, it is possible to reduce a size of the plate-shaped portion in which the first coil is formed.

Accordingly, when an angle at which the first portion and the second portion cross each other is set at an appropriate value and the base plate is appropriately arranged, the base plate, the first coil and the second coils, which are components of the sensor unit, can be arranged in a small space and it becomes possible to realize a compact rolling bearing unit having a sensor.

According to one aspect of the invention, the present invention provides a rolling bearing unit further comprising:

a cap member fixed to the second raceway member and tightly sealing one end portion in the axial direction of the first raceway member;

a sensor unit for outputting a signal according to at least one of the displacement of the first raceway member with respect to the second raceway member and the relative rotary speed of the first raceway member with respect to the second raceway member;

a cap inner plate located inside the cap member; and a signal processing circuit arranged on the cap inner plate and processing the signal sent from the sensor unit when the signal processing circuit receives the signal.

According to the present invention, the signal processing circuit is arranged on the cap inner plate located inside the cap. Therefore, it is possible to remarkably reduce a length of the signal line for connecting the sensor unit with the signal processing circuit. Accordingly, it becomes difficult for the noise to be contained in the signal outputted from the sensor. Therefore, the displacement and rotary speed can be more accurately detected.

A surface area of the cap member facing outside is large and the heat radiating property of the cap member is excellent. Therefore, a quantity of heat reaching the signal processing circuit existing inside the cap member is reduced. Accordingly, electronic parts composing the signal processing circuit can be prevented from being deteriorated by heat.

Since the signal processing circuit is arranged on the base plate inside the cap in the present invention, there is no possibility that the signal processing circuit is deteriorated by dust.

In one aspect of the invention, the first coil and the second coils are arranged on a coil arranging face of the base plate, the second coils output a signal, and a portion surrounded by the second coils on the coil arranging face is located outside in a radial direction of the base plate with respect to the through-hole.

According to the above embodiment, a size in the axial direction of the sensor body of the sensor unit can be suddenly reduced to the substantially same thickness as the thickness of the base plate. Accordingly, the rolling bearing having a sensor can be made compact.

In one aspect of the invention, the sensor unit outputs a signal related to one of the displacement and the relative rotary speed, according to an inductance change in at least one of the first coil and the second coils.

According to the invention described above, physical quantities to be detected can be more accurately detected by using a highly reliable inductance type sensor unit. Accordingly, the physical quantities to be detected can be more accurately detected.

According to the rolling bearing having a sensor of the present invention, the signal processing circuit is arranged on the cap inner plate located inside the cap. Therefore, it is possible to remarkably shorten a length of the signal line for connecting the sensor unit with the signal processing circuit. Therefore, it is possible to reduce noise contained in the signal in which physical information such as displacement information or rotary speed information is contained. Accordingly, it is possible to more accurately detect a displacement and rotary speed.

According to the rolling bearing having a sensor of the present invention, a surface area of the cap member facing outside is large and the heat radiating property is excellent. Therefore, a quantity of heat, which has been conducted to the cap member and reached the signal processing circuit existing in the cap member, is reduced. Accordingly, electronic parts composing the signal processing circuit can be prevented from being deteriorated by heat.

According to the rolling bearing having a sensor of the present invention, since the signal processing circuit is arranged on the cap inner plate located inside the cap in the present invention, there is no possibility that the signal processing circuit is deteriorated by dust.

DETAILED DESCRIPTION OF THE PREFERRED EMBODIMENTS

Figure 1:
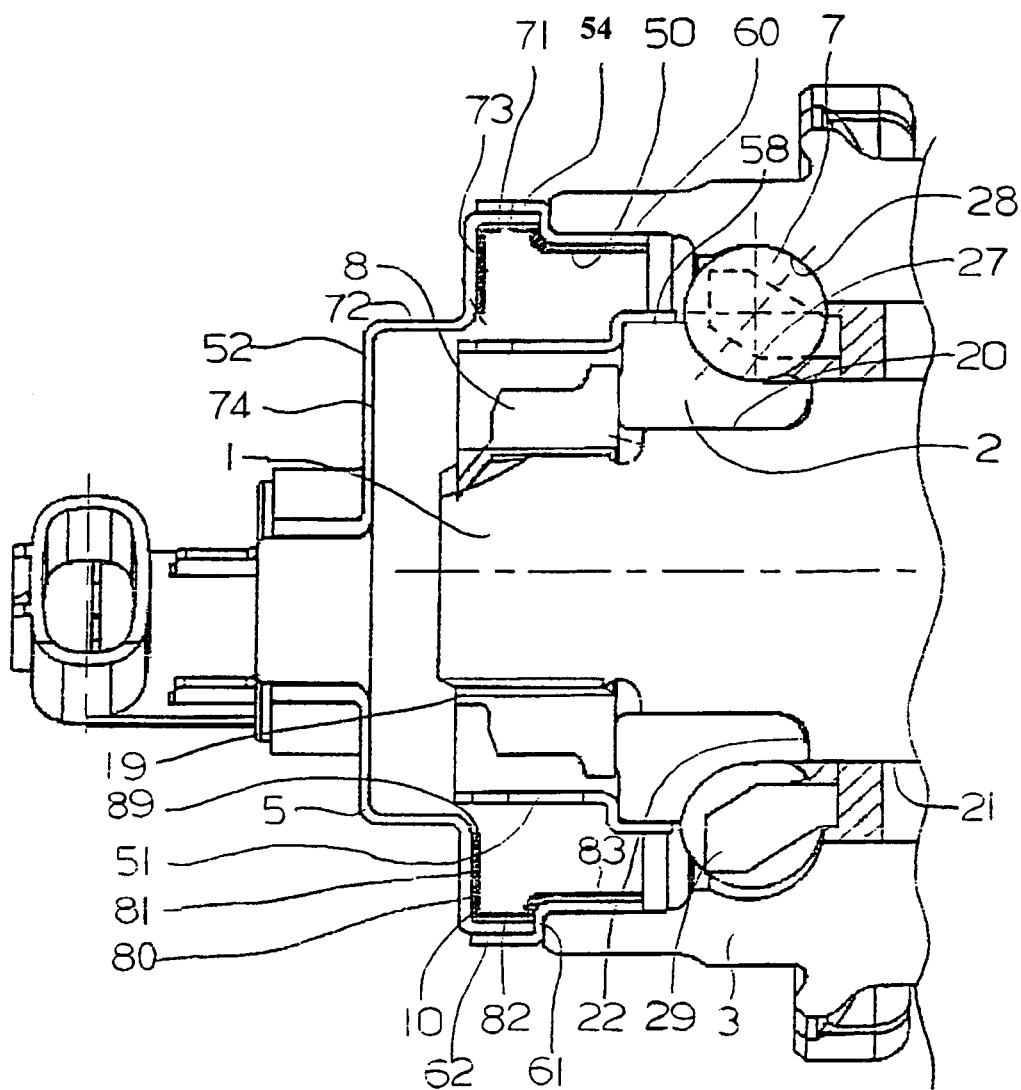
FIG. 1 is a sectional view taken in the axial direction of a rolling bearing unit for a vehicle used for a driven wheel which is a rolling bearing unit having a sensor of an embodiment of the present invention.

Referring to the embodiment shown in the drawings, the present invention will be explained in detail below.

First Embodiment

FIG. 1 is a sectional view taken in the axial direction showing a rolling bearing unit for a vehicle used for a driven wheel (a hub unit for a driven wheel) which is a rolling bearing unit having a sensor of an embodiment of the present invention.

This rolling bearing unit having a sensor includes: an inner shaft 1; an inner ring 2; an outer ring 3 which is a second raceway member; a cap member 5; a plurality of balls 7 which are an example of rolling elements; a nut 8; and a sensor unit 10.

The inner shaft 1 includes: a small diameter shaft portion 19; an intermediate diameter shaft portion 20; and a large diameter shaft portion 21. On an outer circumferential face of the small diameter shaft portion 19, a screw is formed. The intermediate diameter shaft portion 20 is connected to the small diameter shaft portion 19 through the step portion 30. An outer diameter of the intermediate diameter shaft portion 20 is larger than the outer diameter of the small diameter shaft portion 19. The large diameter shaft portion 21 is located on the opposite side to the small diameter shaft portion 19 with respect to the intermediate diameter portion 20. The large diameter shaft portion 21 is connected to the intermediate diameter shaft portion 20 through the step portion 22. An outer diameter of the large diameter shaft portion 21 is larger than the outer diameter of the intermediate diameter shaft portion 20. An outer circumferential face of the large diameter shaft portion 21 includes an angular type raceway groove which is an outer circumferential raceway surface not shown on the right side of the drawing. An outer diameter of this raceway groove is increased when it separates from the intermediate diameter shaft portion 20.

The inner shaft 1 includes a flange, on which a disk brake is mounted, at an end portion (not shown, provided on the right side of the drawing) of the large diameter shaft portion 21 in the axial direction.

The inner ring 2 is outwardly engaged with and fixed to the outer circumferential face of the intermediate diameter shaft portion 20 of the inner shaft 1. An end face on the large diameter shaft portion 21 side in the axial direction of the inner ring 2 comes into contact with the step portion 22. The inner ring 2 includes an angular type raceway groove 27, which is an outer circumferential raceway surface, on the large diameter shaft portion 21 side of the outer circumferential face of the inner ring 2. An outer diameter of this raceway groove 27 is increased when it separates from the large diameter shaft portion 22.

An end face on the large diameter shaft portion 21 side in the axial direction of the inner ring 2 comes into contact with the step portion 22. The nut 8 is screwed to a screw of the small diameter shaft portion 19. An end face on the opposite side to the large diameter shaft portion 21 side in the axial direction of the inner ring 2 comes into contact with an end face on the large diameter shaft portion 21 side in the axial direction of the nut 8. When the nut 8 is screwed onto the large diameter shaft portion 21 side in the axial direction by a predetermined distance, the inner ring 2 can be positively fixed to the inner shaft 1.

The outer ring 3 is positioned outward in the radial direction of the large diameter shaft portion 21. An inner circumferential face of the outer ring 3 includes: a first raceway groove 28 of the angular type which is a first inner circumferential raceway face; and a second raceway groove of the angular type (not shown, arranged on the right side of the drawing) which is a second inner circumferential raceway face. The plurality of balls 7 are arranged between the raceway groove 27 of the inner ring 2 and the first raceway groove 28 of the outer ring 3 being held by the retainer 29 at intervals in the circumferential direction. Although not shown in the drawing, a plurality of balls, which are different from the plurality of balls described above, are arranged between the raceway groove of the inner shaft 1 and the second raceway groove of the outer ring 3 being held by the retainer at intervals in the circumferential direction on the right side of the drawing.

The cap member 5 covers an end portion on the opposite side to the wheel connection side in the axial direction of the inner shaft 1. The cap member 5 includes: a first member 54 having an annular shape; and a second member 52 having an annular shape. The first member 54 includes: a small diameter cylindrical portion 60; a radial direction extending portion 61; and a large diameter cylindrical portion 62. The small diameter cylindrical portion 60 is connected to the large diameter cylindrical portion 62 through the radial direction extending portion 61. The small diameter cylindrical portion 60 is inwardly engaged with an inner circumferential face of the end portion on the opposite side to the wheel connection side in the axial direction of the outer ring 3. The radial direction extending portion 61 comes into contact with an end face in the axial direction of the end portion of the outer ring 3. The outer diameter cylindrical portion 62 extends from the end portion on the outer diameter side of the radial direction extending portion 61 to the opposite side to the wheel connecting side in the axial direction.

The second member 52 includes: a large diameter cylindrical portion 71; a small diameter cylindrical portion 72, the diameter of which is smaller than the diameter of this large diameter cylindrical portion 71; a first radial direction extending portion 73; and a second radial direction extending portion 74. The large diameter cylindrical portion 71 is inwardly engaged with and fixed to an inner circumferential face of the large diameter cylindrical portion 62 of the first member 54. The first and second radial direction extending portions 73, 74 extend in the radial direction. The large diameter cylindrical portion 71 is connected to the small diameter cylindrical portion 72 through the first radial direction extending portion 73. The second radial direction extending portion 74 is connected to the first radial direction extending portion 73 through the small diameter cylindrical portion 72. The second radial direction extending portion 74 is located at an inward position in the radial direction of the first radial direction extending portion 71. The large diameter cylindrical portion 71 is located on the wheel connection side in the axial direction of the small diameter cylindrical portion 72.

The sensor unit 10 includes: a sensor body 50; and a target member 51 made of magnetic material. The sensor body 50 includes: a base plate 80 made of polyimide resin; a first coil; and a second coil. The base plate 80 includes: a first portion 81, the shape of which is annular and flat; a second portion 82, the shape of which is flat; and a third portion 83, the shape of which is flat.

As shown in FIG. 1, the first portion 81 described above is fixed to an end face on the ball 7 side of the first radial direction extending portion 73. The second portion 82 is connected to the first portion 81 through a curved portion. The second portion 82 is fixed onto an inner circumferential face of the large diameter cylindrical portion 71 of the second member 52 of the cap member 5. The third portion 83 is connected to an end in the axial direction on the opposite side to the first portion 81 side of the second portion 82.

The first coil and the second coil are respectively formed into a plane shape. The first coil is arranged in the first portion 81 and the second coil is arranged in the second portion 82. An extending direction of the first coil substantially agrees with an extending direction of the first portion 81. An extending direction of the second coil substantially agrees with an extending direction of the second portion 82. As shown in FIG. 1, the first portion 81 and the second portion 82 cross each other by the substantial angle 90°.

The target member 51 is formed into a substantial cylindrical shape. One end portion in the axial direction of the target member 51 is press-fitted into an end portion on the nut 8 side in the axial direction on the cylindrical outer circumferential face of the inner ring 2. The one end portion in the axial direction of the target member 51 is outwardly engaged with and fixed to the cylindrical outer circumferential face 58, which is an end face of the outer circumferential face of the inner ring 2, by means of press-fitting.

In this specification, the first raceway member includes: members, on the outer circumferences of which a raceway is provided, that is, the inner shaft 1 and the inner ring 2; and all members immovably fixed to the inner shaft 1 and the inner ring 2. The inner shaft 1, the inner ring 2 and the target member 51 respectively compose a portion of the first raceway member.

Figure 2:
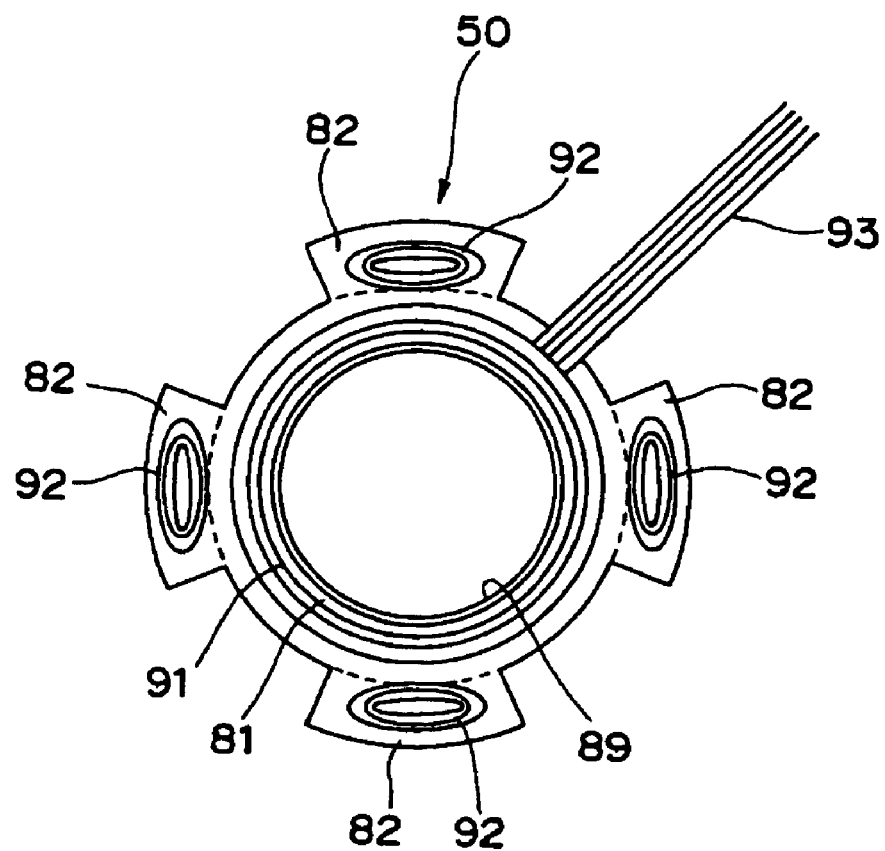
FIG. 2 is a schematic illustration showing peripheries of the first portion and the second portion of a sensor body.

FIG. 2 is a schematic illustration showing peripheries of the first and second portions 81, 82 of the sensor body 50. In this connection, as clearly shown in FIG. 1, the first and second portions 81, 82 meet at substantial right angles with each other. However, in order to make it easy to understand the structure of the coil 91, the first and second portions 81, 82 are drawn in FIG. 2 in such a manner that the first and second portions 81, 82 do not meet at substantial right angles with each other.

As shown in FIG. 2, the first portion 81 is formed into an annular shape and provided with the through-hole 89. The first coil 91, which is formed into a plane shape, is arranged in the first portion 81 so that the first coil 91 can surround the through-hole 89 (the target member 51 shown in FIG. 1) all over the circumference. The second coil 92, which is formed into a plane shape, is spirally arranged in the second portion 82.

As shown in FIG. 2, the second coils 92, the number of which is four, are provided. The four second coils 92 are arranged in the circumferential direction at regular intervals. An oscillator (a drive circuit) not shown is connected to the first coil 91 through the cable 93.

The oscillator described above generates a high frequency current, the frequency of which is in a range from 100 kHz to 10 MHz. This high frequency current flows into the first coil 91 through the cable 93.

Since the target member 51 is made of magnetic material, a magnetic flux generated by the first coil 91 passes through the target member 51. Accordingly, when a load acts on the target member 51 and the target member 51 approaches one of the second coils 92, according to a magnetic field of high frequency generated by the first coil 91, an induced electromotive force generated in the second coil 92 is increased. On the other hand, when a load acts on the target member 51 and the target member 51 recedes from one of the second coils 92, according to a magnetic field of high frequency generated by the first coil 91, an induced electromotive force generated in the second coil 92 is decreased.

Accordingly, in the case where the target member 51 is made of the same magnetic material like this embodiment, when an induced electromotive force generated by each second coil 92 is measured, it is possible to measure a distance between each second coil 92 and the target member 51.

For example, in the case where portions of the target member, which is opposed to the first coil in the radial direction, are alternatively located in the circumferential direction and formed out of two portions (the first and second portions), the magnetic permeability of which is different from each other, or alternatively in the case where tooth-shaped protruding and recessing portions are repeatedly formed in the circumferential direction, an induced electromotive force generated by the second coil becomes an induced electromotive force having a periodicity depending upon a relative rotary speed (a relative rotary speed of the second raceway member with respect to the first raceway member) of a slinger with respect to the base plate. When this period is detected, a rotary speed of the second raceway member with respect to the first raceway member can be detected.

According to the rolling bearing unit having a sensor of the embodiment described above, the first portion 81, in which the plane-shaped first coil 91 is arranged, and the second portion 92, in which the plane-shaped second coil 92 is arranged, cross each other. Therefore, as compared with a case in which the first coil and the second coil are formed in the same plate-shaped portion, it is possible to reduce a size in the extending direction of the first portion 81 in which the first coil is formed.

Accordingly, in the present embodiment, the first portion 81 extends in the radial direction of the outer ring 3 and a size in the radial direction of the sensor body 50 can be reduced. Accordingly, in the case where a size in the radial direction of the sensor arranging space is small or even in the case where the size in the radial direction of the sensor arranging space is reduced, the sensor body can be easily arranged in the space. Accordingly, the rolling bearing unit having a sensor can be made compact.

According to the rolling bearing unit having a sensor of the embodiment described above, the first and second portions 81, 82 are respectively made of resin and the first coil 91 is arranged in the first portion 81 and further the second coil 92 is arranged in the second portion 82. Therefore, the first and second coils 91, 92 can be positively insulated. Further, it is possible to prevent the generation of noise caused by the contact of the coils 91, 92 with foreign objects such as dust. Accordingly, physical quantities to be detected can be accurately detected.

Figure 3:
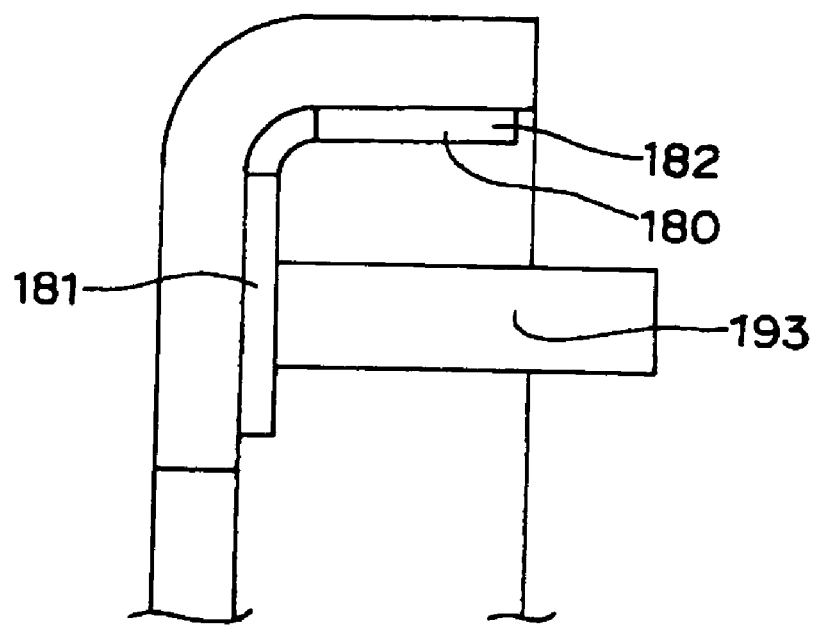
FIG. 3 is a schematic illustration showing a variation of a sensor body.

In this connection, in the rolling bearing unit having a sensor of the embodiment described above, the third portion is provided in the second portion on the opposite side to the first portion. However, in the present invention, as shown in the schematic illustration of FIG. 3, the third portion may not be provided in the second portion 182 of the base plate 180 on the opposite side to the first portion 181. In this connection, in FIG. 3, reference numeral 193 is a signal line for supplying a high frequency current to the first coil.

In the rolling bearing unit having a sensor of the embodiment described above, the number of the second coils 92 is four. However, in the present invention, the number of the second coils may be any natural number except for four.

In the rolling bearing unit having a sensor of the embodiment described above, the base plate 80 is made of polyimide resin. However, in the present invention, as long as it is a flexible insulating resin capable of being bent, any resin can be used as the material of the base plate.

In the rolling bearing unit having a sensor of the embodiment described above, the first and second portions 81, 82 cross each other by the substantial angle 90°. However in the present invention, the first and second portions may cross each other by any angle in a range larger than 0° and smaller than 180°. That is, the crossing angle may not be approximately 90°, which is unlike the embodiment described above.

In the rolling bearing unit having a sensor of the embodiment described above, a displacement is detected by the sensor unit 10. However, the constitution of the present invention may be made as follows. Portions of the target member made of magnetic material opposed to the first coil in the radial direction are alternately positioned in the circumferential direction and formed out of two portions (the first and second portions), the magnetic permeability of which is different from each other. Alternatively, tooth-shaped protruding and recessing portions may be repeated in the circumferential direction.

In this case, an induced electromotive force generated by the second coil becomes an induced electromotive force having a periodicity depending upon a relative rotary speed (a relative rotary speed of the second raceway member with respect to the first raceway member) of a slinger with respect to the base plate. When this period is detected, a rotary speed of the second raceway member with respect to the first raceway member can be detected.

In the embodiment described above, the rolling bearing unit having a sensor is a hub unit. However, the rolling bearing unit having a sensor of the present invention is not limited to the hub unit. For example, the rolling bearing unit having a sensor may be any bearing unit such as a magnetic bearing unit except for the hub unit. Of course, the constitution of the present invention, which has been explained above referring to the embodiment, can be applied to various bearing units having the necessity of measuring a plurality of moment loads and translation loads.

In the rolling bearing unit having a sensor of the above embodiment, the rolling elements of the rolling bearing unit having a sensor to be manufactured are balls. However, in the present invention, the rolling elements of the rolling bearing unit having a sensor to be manufactured may be rollers. Further, the rolling elements of the rolling bearing unit having a sensor to be manufactured may include both rollers and balls.

Second Embodiment

Figure 4:
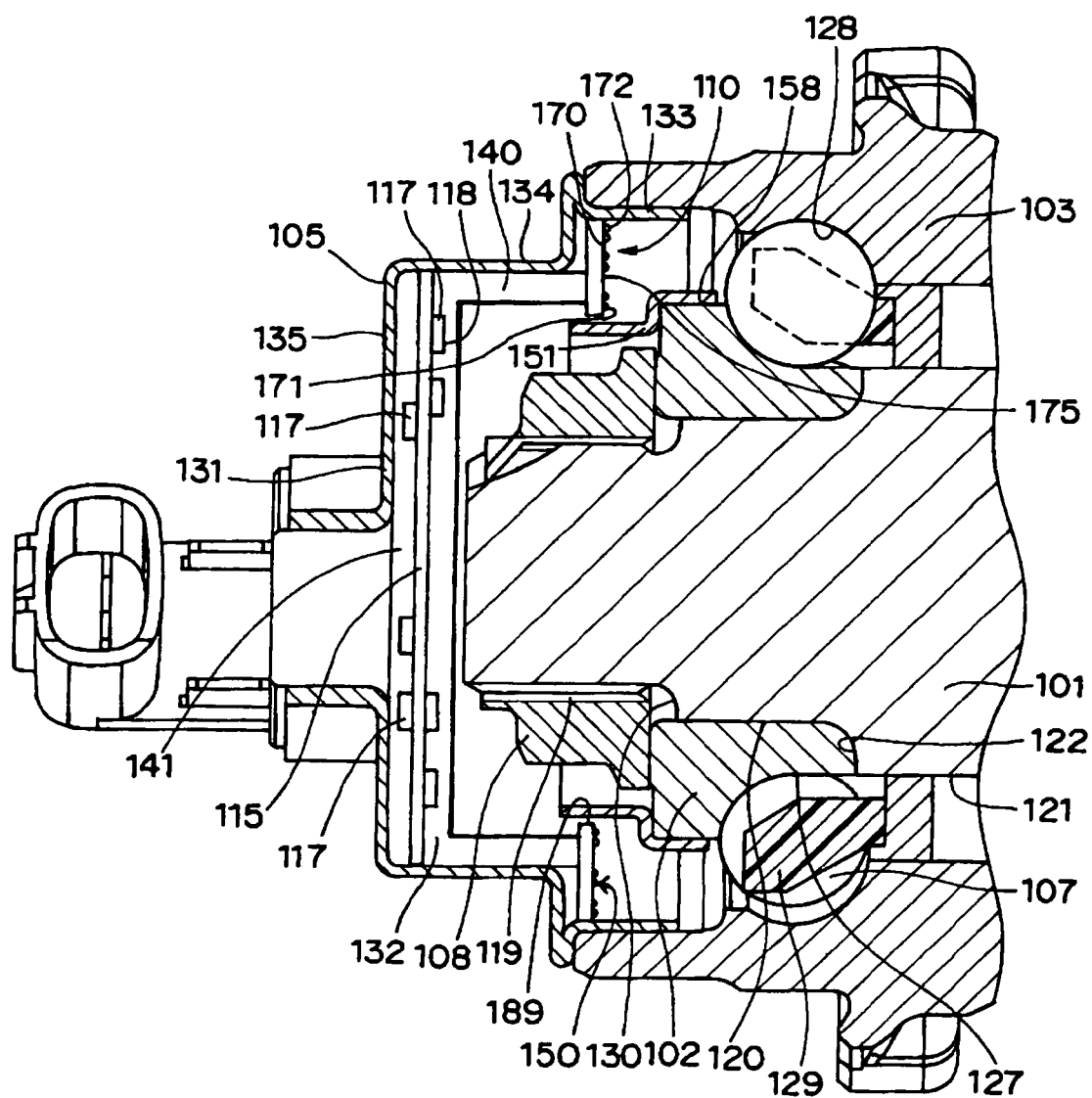
FIG. 4 is a sectional view taken in the axial direction of a rolling bearing unit (a hub unit for a driven wheel) for a vehicle used for a driven wheel which is a rolling bearing unit having a sensor of a second embodiment of the present invention.

FIG. 4 is a sectional view taken in the axial direction showing a rolling bearing unit for a vehicle used for a driven wheel (a hub unit for a driven wheel) which is a rolling bearing unit having a sensor of a second embodiment of the present invention.

This rolling bearing unit having a sensor includes: an inner shaft 101; an inner ring 102; an outer ring 103 which is a second raceway member; a cap member 105; a plurality of balls 107 which are an example of rolling elements; a nut 108; and a sensor unit 110.

This rolling bearing unit having a sensor includes: a base plate 115 in a cap; and a plurality of electronic parts 117 mounted on the base plate 115 in a cap, wherein these components are provided inside the cap member 105. The plurality of electronic parts 117 compose the signal processing circuit 118. The electronic parts 117 described above are mounted on both sides of the base plate 115 inside the cap.

The inner shaft 101 includes: a small diameter shaft portion 119; an intermediate diameter shaft portion 120; and a large diameter shaft portion 121. On an outer circumferential face of the small diameter shaft portion 119, a screw is formed. The intermediate diameter shaft portion 120 is connected to the small diameter shaft portion 119 through the step portion 130. An outer diameter of the intermediate diameter shaft portion 120 is larger than the outer diameter of the small diameter shaft portion 119. The large diameter shaft portion 121 is located on the opposite side to the small diameter shaft portion 119 with respect to the intermediate diameter portion 120. The large diameter shaft portion 121 is connected to the intermediate diameter shaft portion 120 through the step portion 122. An outer diameter of the large diameter shaft portion 121 is larger than the outer diameter of the intermediate diameter shaft portion 120. An outer circumferential face of the large diameter shaft portion 121 includes an angular type raceway groove which is an outer circumferential raceway surface not shown on the right side of the drawing. An outer diameter of this raceway groove is increased when it separates from the intermediate diameter shaft portion 120.

The inner shaft 101 includes a flange, on which a disk brake is mounted, at an end portion (not shown, provided on the right side of the drawing) of the large diameter shaft portion 121 in the axial direction.

The inner ring 102 is outwardly engaged with and fixed to the outer circumferential face of the intermediate diameter shaft portion 120 of the inner shaft 101. An end face on the large diameter shaft portion 121 side in the axial direction of the inner ring 102 comes into contact with the step portion 122. The inner ring 102 includes an angular type raceway groove 127, which is an outer circumferential raceway surface, on the large diameter shaft portion 121 side of the outer circumferential face of the inner ring 102. An outer diameter of this raceway groove 127 is increased when it separates from the large diameter shaft portion 122.

An end face on the large diameter shaft portion 121 side in the axial direction of the inner ring 102 comes into contact with the step portion 122. The nut 108 is screwed to a screw of the small diameter shaft portion 119. An end face on the opposite side to the large diameter shaft portion 121 side in the axial direction of the inner ring 102 comes into contact with an end face on the large diameter shaft portion 121 side in the axial direction of the nut 108. When the nut 108 is screwed onto the large diameter shaft portion 121 side in the axial direction by a predetermined distance, the inner ring 102 can be positively fixed to the inner shaft 101.

The outer ring 103 is positioned outward in the radial direction of the large diameter shaft portion 121. An inner circumferential face of the outer ring 103 includes: a first raceway groove 128 of the angular type which is a first inner circumferential raceway face; and a second raceway groove 128 of the angular type (not shown, arranged on the right side of the drawing) which is a second inner circumferential raceway face. The plurality of balls 107 are arranged between the raceway groove 127 of the inner ring 102 and the first raceway groove 128 of the outer ring 103 being held by the retainer 129 at intervals in the circumferential direction. Although not shown in the drawings, a plurality of balls, which are different from the plurality of balls described above, are arranged between the raceway groove of the inner shaft 101 and the second raceway groove of the outer ring 103 being held by the retainer at intervals in the circumferential direction on the right side of the drawing.

The cap member 105 tightly seals up an end portion on the opposite side to the wheel connection side in the axial direction of the inner shaft 101. The cap member 105 includes: a core bar portion 131, the shape of which is annular; and a resin molding portion 132. The core bar portion 131 includes: a large diameter cylindrical portion 133; a small diameter cylindrical portion 134; and a disk portion 135. The large diameter cylindrical portion 133 is inwardly engaged with and fixed to the inner circumferential face of the end portion on the opposite side to the wheel connection side of the outer ring 103 under the condition that a fastening interference is provided. An outer diameter of the small diameter cylindrical portion 134 is smaller than an outer diameter of the large diameter cylindrical portion 133 and the small diameter cylindrical portion 134 is continued to the large diameter cylindrical portion 133 through a step portion. The small diameter cylindrical portion 134 is extended in the substantial axial direction. The disk portion 135 is extended in the substantial radial direction inwardly in the radial direction from an end portion on the opposite side to the large diameter cylindrical portion 133 of the small diameter cylindrical portion 134.

The resin molding portion 132 is located inward in the radial direction of the small diameter cylindrical portion 134 of the core bar portion 131 and on the inner shaft 101 side in the axial direction of the disk portion 153 of the core bar portion 131. The resin molding portion 132 is formed being laid along the inner circumferential face 134 of the small diameter cylindrical portion 134 of the core bar portion 131 and also along an end face on the inner shaft 101 side in the axial direction of the disk portion 135. To be in detail, a cross-sectional shape of the resin molding portion 132 is formed into a C-shape and the resin molding portion 132 includes a cylindrical portion 140 and a disk portion 141. The cylindrical portion 140 is extended in the substantial axial direction. On the other hand, the disk portion 141 is extended in the substantial radial direction. The cylindrical portion 140 includes an outer circumferential face coming into contact with the inner circumferential face of the small diameter cylindrical portion 134 of the core bar portion 131. On the other hand, the disk portion 141 includes an end face in the axial direction coming into contact with the end face on the inner shaft 101 side in the axial direction of the core bar portion 131.

As described above, the cap inner plate 115 is arranged in the resin molding portion 132. The cap inner plate 115 is formed into a disk shape. An outer diameter of the cap inner plate 115 is substantially the same as the inner diameter of the inner circumferential face of the small diameter cylindrical portion 134 of the core bar portion 131. An outer circumferential face of the cap inner plate 115 comes into contact with the inner circumferential face of the small diameter cylindrical portion 134 of the core bar portion 131. The cap inner plate 115 is extended in the substantial radial direction.

The sensor unit 110 includes: a sensor body 150; and a target member 151 made of magnetic material. The sensor body 150 includes: a base plate 170 for arranging coils; a first coil 171; and a second coil 172.

The coil arranging base plate 170 is made of glass fabric base material epoxy resin. The coil arranging base plate 170 is flat and annular and provided with a through-hole 189. The inner shaft 101 penetrates this through-hole 189.

An outer circumferential face of the coil arranging base plate 170 comes into contact with an inner circumferential face of the large diameter cylindrical portion 133 of the core bar portion 131. The coil arranging base plate 170 is fixed onto an end face on the ball 107 side in the axial direction of the resin molding portion 132. The coil arranging base plate 170 is extended in the substantial radial direction of the outer ring 103. The first coil 171 is located inward in the radial direction with respect to the second coil 172.

The target member 151 is formed into a substantial cylindrical shape. One end portion in the axial direction of the target member 151 is press-fitted into an end portion on the nut 108 side in the axial direction on the cylindrical outer circumferential face of the inner ring 102. The one end portion in the axial direction of the target member 151 is outwardly engaged with and fixed to the cylindrical outer circumferential face 158, which is an end face of the outer circumferential face of the inner ring 102, by means of press-fitting.

In this specification, the first raceway member includes: members, on the outer circumferences of which a raceway is provided, that is, the inner shaft 101 and the inner ring 102; and all members immovably fixed to the inner shaft 101 and the inner ring 102. The inner shaft 101, the inner ring 102 and the target member 151 respectively compose a portion of the first raceway member.

Figure 5:
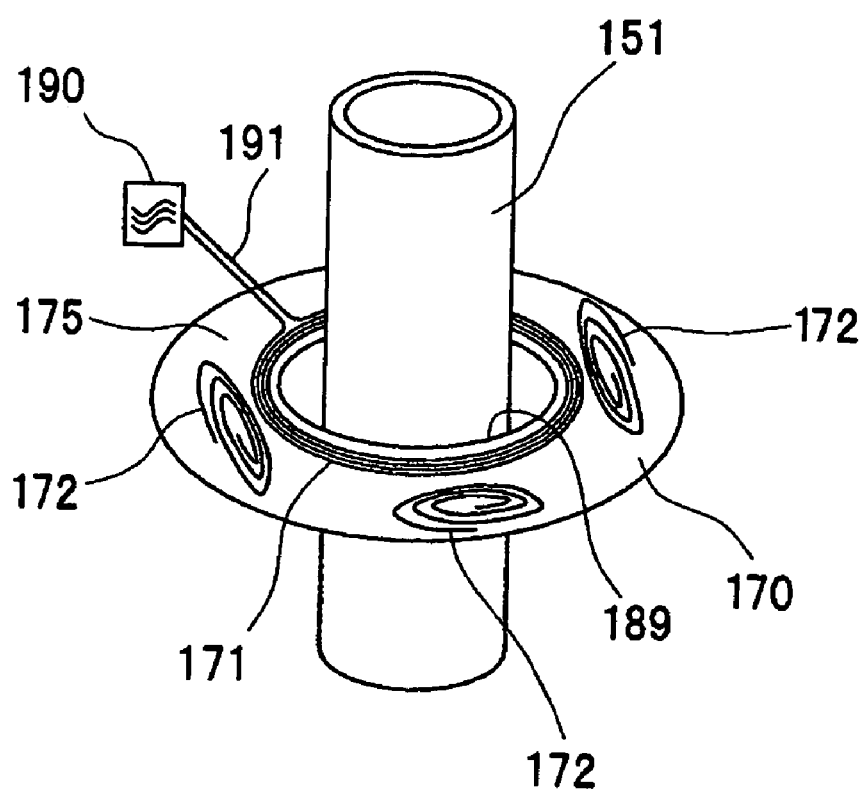
FIG. 5 is a schematic illustration schematically showing a periphery of a base plate for arranging a coil.

FIG. 5 is a schematic illustration schematically showing a peripheral portion of the coil arranging base plate 170.

As shown in FIG. 5, the target member 151 penetrates the through-hole 189 of the annular base plate 170. The first coil 171 is formed into a plane-shape. The first coil 171 is formed on one face 175 of the base plate 170 so that the first coil 171 can surround the target member 151 (the first raceway member) all over the circumference. On the other hand, the second coil 172 is formed into a plane-shape. The second coil 172 is spirally formed on one face 175 described above so that the second coil 172 can not come into contact with the first coil 171. The second coil 172 is arranged so that it can not surround the first raceway member described above. On one face 175 described above of the base plate 170, a portion that the second coil 172 surrounds is located outward in the radial direction of the base plate 170 with respect to the through-hole 189 of the base plate 170.

The second coils 172, the number of which is four, are provided. The four second coils 172 are arranged in the circumferential direction at regular intervals. On the cap inner plate 115 (shown in FIG. 4), the oscillator 190 (the drive circuit) is arranged. This oscillator 190 is connected to the first coil 171 through the cable 191.

The oscillator 190 described above generates a high frequency current, the frequency of which is, for example, in a range from 100 KHz to 10 MHz. This high frequency current flows into the first coil 171 through the cable 191.

Since the target member 151 is made of magnetic material, a magnetic flux generated by the first coil 171 passes through the target member 151. Accordingly, when a load acts on the target member 151 and the target member 151 approaches one of the second coils 172, according to a magnetic field of high frequency generated by the first coil 171, an induced electromotive force generated in the second coil 172 is increased. On the other hand, when a load acts on the target member 151 and the target member 151 recedes from one of the second coils 172, according to a magnetic field of high frequency generated by the first coil 171, an induced electromotive force generated in the second coil 172 is decreased.

Accordingly, in the case where the target member 151 is made of the same magnetic material like this embodiment, when an induced electromotive force generated by each second coil 172 is measured, it is possible to measure a distance between each second coil 172 and the target member 151.

For example, in the case where portions of the target member, which is opposed to the first coil in the radial direction, are alternatively located in the circumferential direction and formed out of two portions (the first and second portions), the magnetic permeability of which is different from each other, or alternatively in the case where tooth-shaped protruding and recessing portions are repeatedly formed in the circumferential direction, an induced electromotive force generated by the second coil becomes an induced electromotive force having a periodicity depending upon a relative rotary speed (a relative rotary speed of the second raceway member with respect to the first raceway member) of a slinger with respect to the base plate. When this period is detected, a rotary speed of the second raceway member with respect to the first raceway member can be detected.

Returning to the original subject, each second coil 172 described above is connected to the signal processing circuit 118 on the cap inner plate 115 through a signal line not shown. The signal processing circuit 118 receives a signal (a weak signal) from each second coil 172 and amplifies this signal by a well known amplifying circuit having an operational amplifier and executes an envelope detection in a well known envelope detection circuit, so that a signal, which expresses that a piece of displacement information of the second raceway member with respect to the first raceway member is remarkable, can be generated from an induced electromotive force generated in the second coil.

According to the rolling bearing unit having a sensor of the second embodiment, the signal processing circuit 118 is arranged on the cap inner plate 115 located in the cap member 105. Therefore, as compared with the conventional constitution in which the signal processing circuit is located on the opposite side to the rolling element side with respect to the cap member, a length of the signal line connecting the sensor unit 110 with the signal processing circuit 118 can be remarkably shortened. Accordingly, noise is seldom mixed in the signal outputted from the sensor. Therefore, a displacement and rotary speed can be more accurately detected. Especially, even when a signal sent from the sensor body 150 is weak, physical information can be positively picked up from the weak signal.

According to the rolling bearing having a sensor of the second embodiment described above, a surface area of the cap member 105 facing outside is large and the heat radiating property is excellent. Therefore, a quantity of heat reaching the signal processing circuit 118 existing in the cap member 105 is reduced. Accordingly, electronic parts 117 composing the signal processing circuit 118 can be prevented from being deteriorated by heat.

According to the rolling bearing having a sensor of the second embodiment described above, the cap inner plate 115, on which the electronic parts 117 composing the signal processing circuit 118 are mounted, is arranged in the cap member 105 existing at a position where a wind generated by the rolling balls 107 is blowing. Therefore, the heat radiating effect of the cap member 105 can be further enhanced by the wind. For the above reasons, the electronic parts can be prevented from being deteriorated by heat.

According to the rolling bearing having a sensor of the second embodiment described above, since the signal processing circuit 118 is arranged on the cap inner plate 115 in the cap member 105 in the present invention, there is no possibility that the electronic parts 117 are deteriorated by dust.

According to the rolling bearing having a sensor of the second embodiment described above, the sensor body 150 is formed out of the base plate 170 and the coils 171, 172 formed on one face 175 of the base plate 170. Therefore, a size in the axial direction of the sensor body 150 can be suddenly shortened to the substantial thickness of the base plate 170. Accordingly, the rolling bearing having a sensor can be made compact and a space in which the rolling bearing having a sensor is arranged can be reduced.

In the rolling bearing unit having a sensor of the second embodiment described above, the number of the second coils 172 is four. However, in the present invention, the number of the second coils may be any natural number except for four.

In the rolling bearing unit having a sensor of the second embodiment described above, coil sets, each coil set includes two coils 171, 172, are arranged in the axial direction in a row. However, in the present invention, two coil sets are arranged on both sides of the base plate or alternatively a plurality of base plates are arranged in parallel with each other and two coil sets are formed on the face of each base plate. Due to the foregoing, two coil sets may be arranged in the axial direction in a plurality of rows.

For example, two coil sets are arranged in the axial direction in two rows. In this case, a coil surrounding the first raceway member of one coil set is defined as the first coil, a coil located outward in the radial direction of the first coil is defined as the second coil, a coil surrounding the first raceway member of the other coil set is defined as the third coil and a coil located outward in the radial direction of the third coil is defined as the fourth coil. Further, when a recess portion or a region, the magnetic permeability of which is different from that in the periphery, is formed in a portion on the outer circumferential face of the first raceway member respectively opposed in the radial direction of the second and the fourth coil, it is possible to detect five loads acting on this rolling bearing unit having a sensor. Concerning this matter, refer to the JP-A-2007-127253. The method of detecting five loads disclosed in this publication can be used in the completely same manner in the present embodiment in which the sensor body 150 having the base plate 170 is used.

In the rolling bearing unit having a sensor of the second embodiment described above, a displacement is detected by the sensor unit 110. However, the constitution of the present invention may be made as follows. Portions of the target member made of magnetic material opposed to the first coil in the radial direction are alternately positioned in the circumferential direction and formed out of two portions (the first and second portions), the magnetic permeability of which is different from each other. Alternatively, tooth-shaped protruding and recessing portions may be repeated in the circumferential direction.

In this case, an induced electromotive force generated by the second coil becomes an induced electromotive force having a periodicity depending upon a relative rotary speed (a relative rotary speed of the second raceway member with respect to the first raceway member) of a slinger with respect to the base plate. When this period is detected, a rotary speed of the second raceway member with respect to the first raceway member can be detected.

In the rolling bearing unit having a sensor of the second embodiment described above, the sensor unit 110 is used which includes a sensor body 105 having a base plate 170. However, in the present invention, the sensor unit may include a coil and according to a displacement of the inductance of the coil, a displacement of the second raceway member with respect to the first raceway member may be detected (refer to JP-A-2007-127253). In this case, physical quantities to be detected can be more accurately detected by using the highly reliable inductance type sensor unit.

In this connection, of course, the sensor unit capable of being used in the present invention is not limited to the sensor unit in which the base plate is used as described above or the sensor unit in which the inductance type displacement sensor is used. That is, as long as it is a non-contact type sensor unit capable of detecting a gap such as a sensor unit in which the Hall element is used, any displacement sensor may be used.

In the second embodiment described above, the rolling bearing unit having a sensor is a hub unit. However, the rolling bearing unit having a sensor of the present invention is not limited to the hub unit. For example, the rolling bearing unit having a sensor may be any bearing unit such as a magnetic bearing unit except for the hub unit. Of course, the constitution of the present invention, which has been explained above referring to the second embodiment, can be applied to various bearing units having the necessity of measuring a plurality of moment loads and translation loads.

In the rolling bearing unit having a sensor of the second embodiment, the rolling elements of the rolling bearing unit having a sensor to be manufactured are balls. However, in the present invention, the rolling elements of the rolling bearing unit having a sensor to be manufactured may be rollers. Further, the rolling elements of the rolling bearing unit having a sensor to be manufactured may include both rollers and balls.

What is claimed is:

1. A rolling bearing unit including a sensor, the rolling bearing unit comprising:
   a first raceway member, on an outer circumferential surface of which a raceway surface is provided;
   a second raceway member, on an inner circumferential surface of which a raceway surface is provided;
   a plurality of rolling elements arranged between the raceway surface of the first raceway member and the raceway surface of the second raceway member;
   a base plate, a shape of which is formed into an annular and flat shape, including a through-hole that the first raceway member penetrates;
   a plane-shaped first coil arranged so that the first coil surrounds an overall circumference of the first raceway member; and
   a plurality of plane-shaped second coils arranged around the first coil along a circumferential direction of the first coil,
   wherein the base plate includes a first portion which is formed into an annular and flat shape and includes the through-hole that the first raceway member penetrates and a second portion which is formed into a flat shape and crosses the first portion,
   wherein the first coil is arranged in the first portion, and
   wherein the second coils are arranged in the second portion.

2. The rolling bearing unit according to claim 1, wherein the first coil and the second coils are mounted on the base plate so as to be arranged on an identical plane.

3. The rolling bearing unit according to claim 1, wherein the first portion and the second portion comprise resin, and the first coil is embedded within the first portion and the second coils are embedded within the second portion.

4. The rolling bearing unit according to claim 1, further comprising:
   a cap member fixed to the second raceway member and tightly sealing one end portion in an axial direction of the first raceway member;
   a sensor unit for outputting a signal according to at least one of the displacement of the first raceway member with respect to the second raceway member and a relative rotary speed of the first raceway member with respect to the second raceway member;
a cap inner plate located inside the cap member; and
a signal processing circuit arranged on the cap inner plate and processing the signal sent from the sensor unit when the signal processing circuit receives the signal.

5. The rolling bearing unit according to claim 4,
wherein the first coil and the second coils are arranged on a coil arranging face of the base plate,
wherein the second coils output a signal, and
wherein a portion surrounded by the second coils on the coil arranging face is located outside in a radial direction of the base plate with respect to the through-hole.

6. The rolling bearing unit according to claim 4, wherein the sensor unit outputs a signal related to one of the displacement and the relative rotary speed, according to an inductance change in at least one of the first coil and the second coils.

* * * * *